H. L. WHITMAN.
BALING PRESS.
APPLICATION FILED DEC. 9, 1910.
1,006,327.
Patented Oct. 17, 1911.
8 SHEETS—SHEET 5.
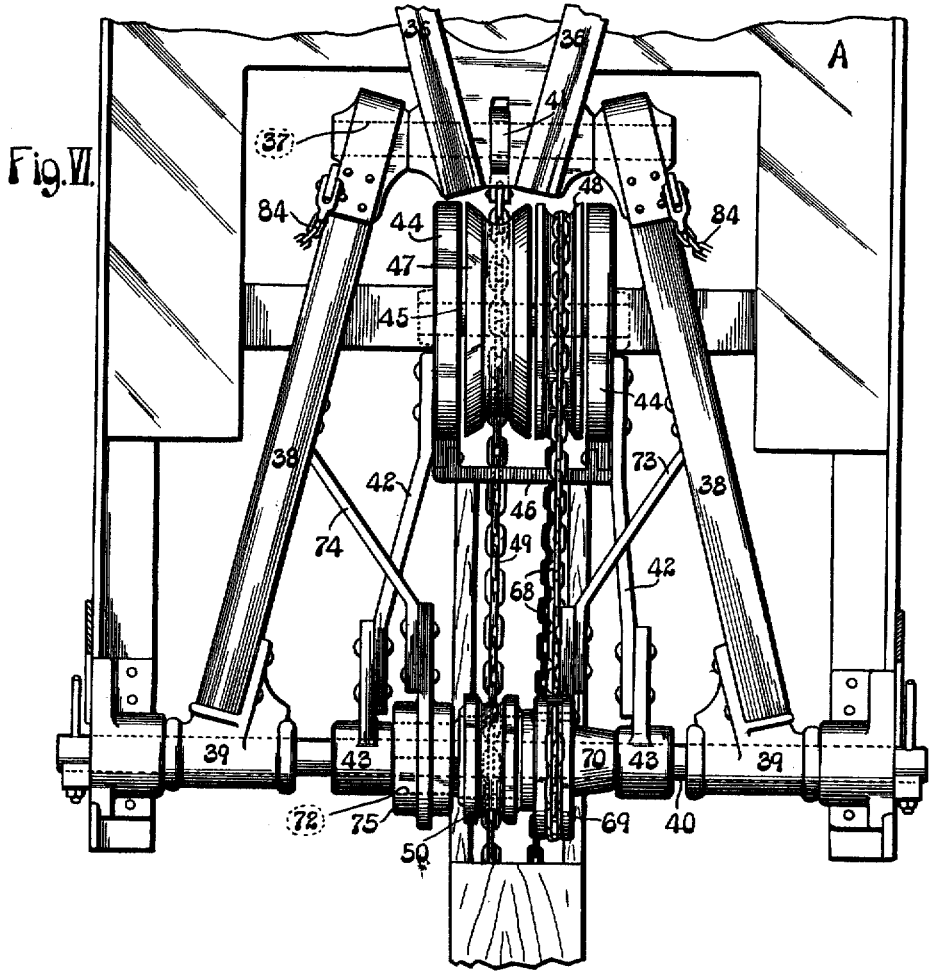
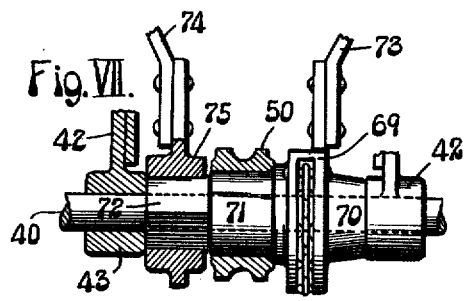
Attest
A. J. McCauley
E. B. Finney
Inventor:
H. L. Whitman
ATT'YS Knight & Cook
BY C. S. Knight H. L. WHITMAN.
BALING PRESS.
APPLICATION FILED DEC. 9, 1910.
1,006,327.
Patented Oct. 17, 1911.
8 SHEETS—SHEET 6.
Fig. VIII.
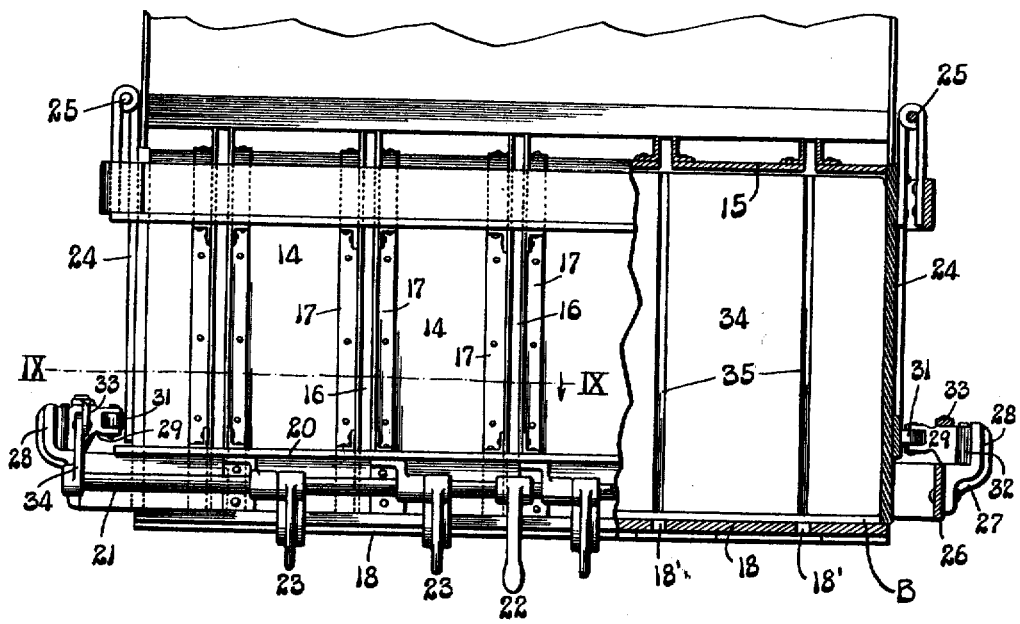
Fig. IX.
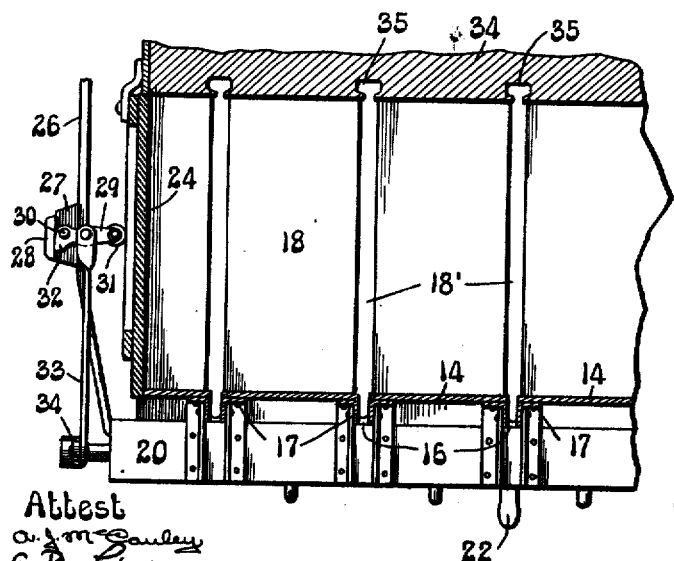
Inventor:
H. L. Whitman

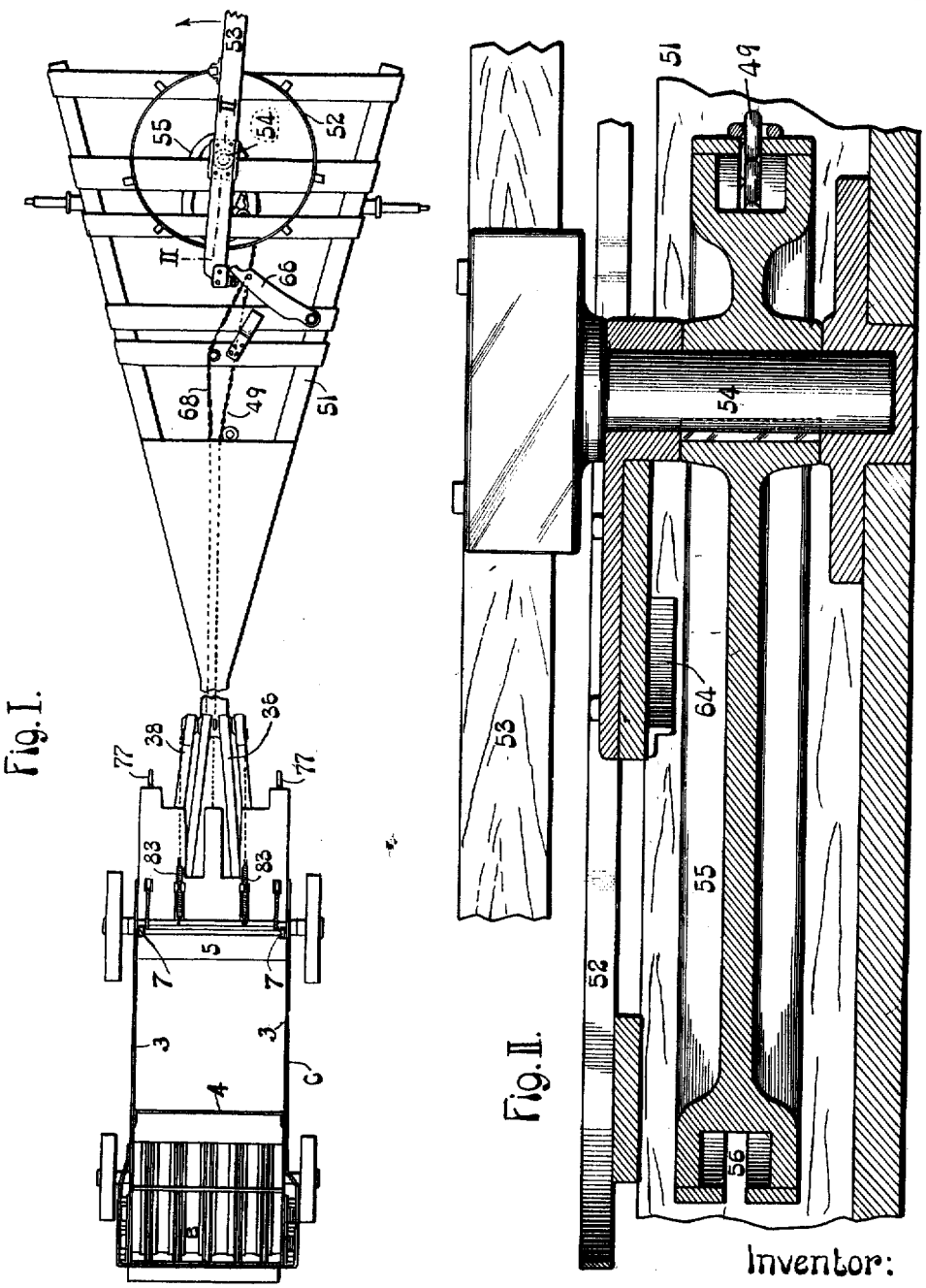
H. L. WHITMAN.
BALING PRESS.
APPLICATION FILED DEC. 9, 1910.
1,006,327.
Patented Oct. 17, 1911.
8 SHEETS—SHEET 1.
Fig. I.
Fig. II.
Attest
A. J. McCauley
E. B. Finn
Inventor:
H. L. Whitman
ATT'YS Knight & Cook
BY E. C. Knight

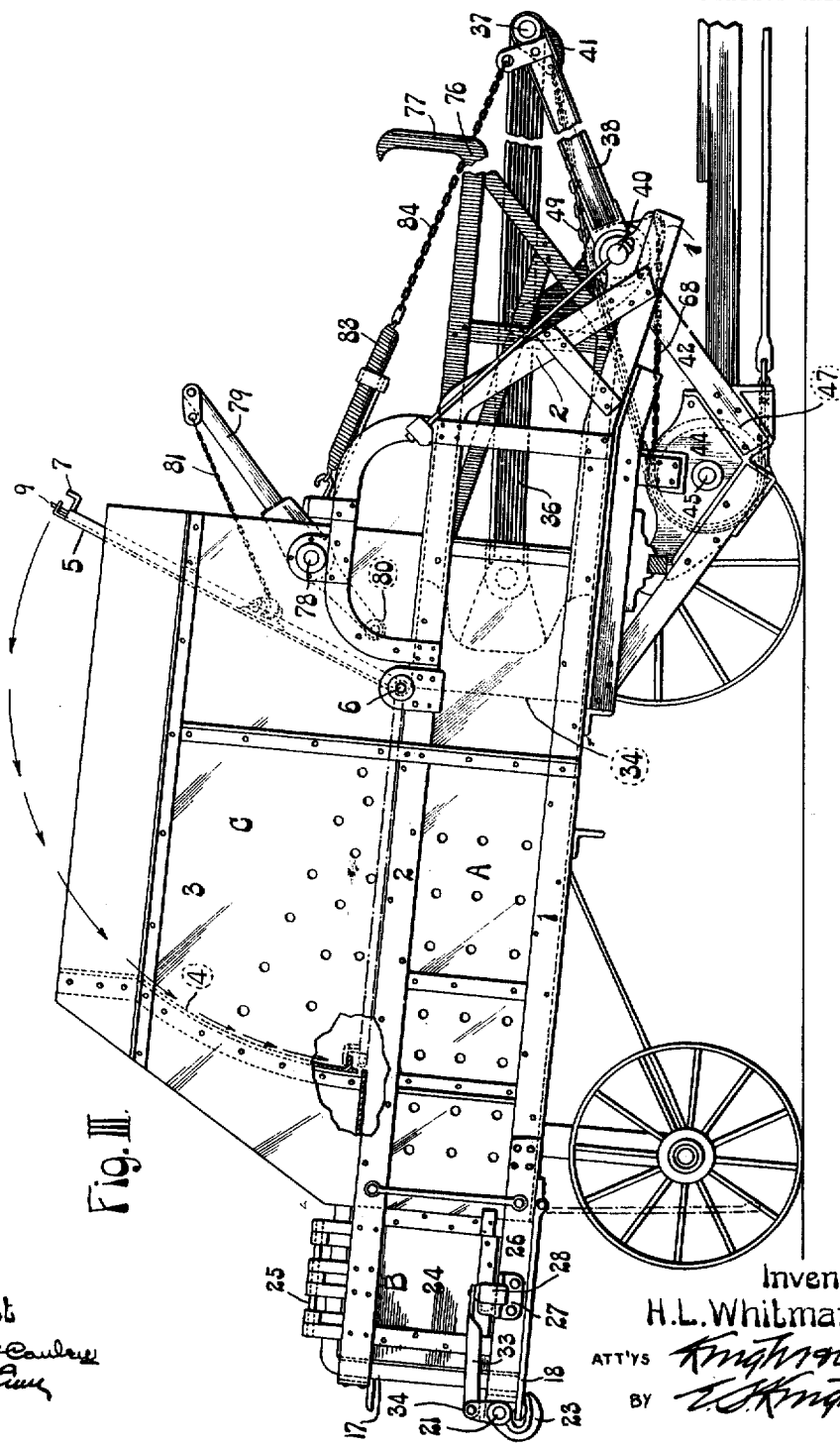

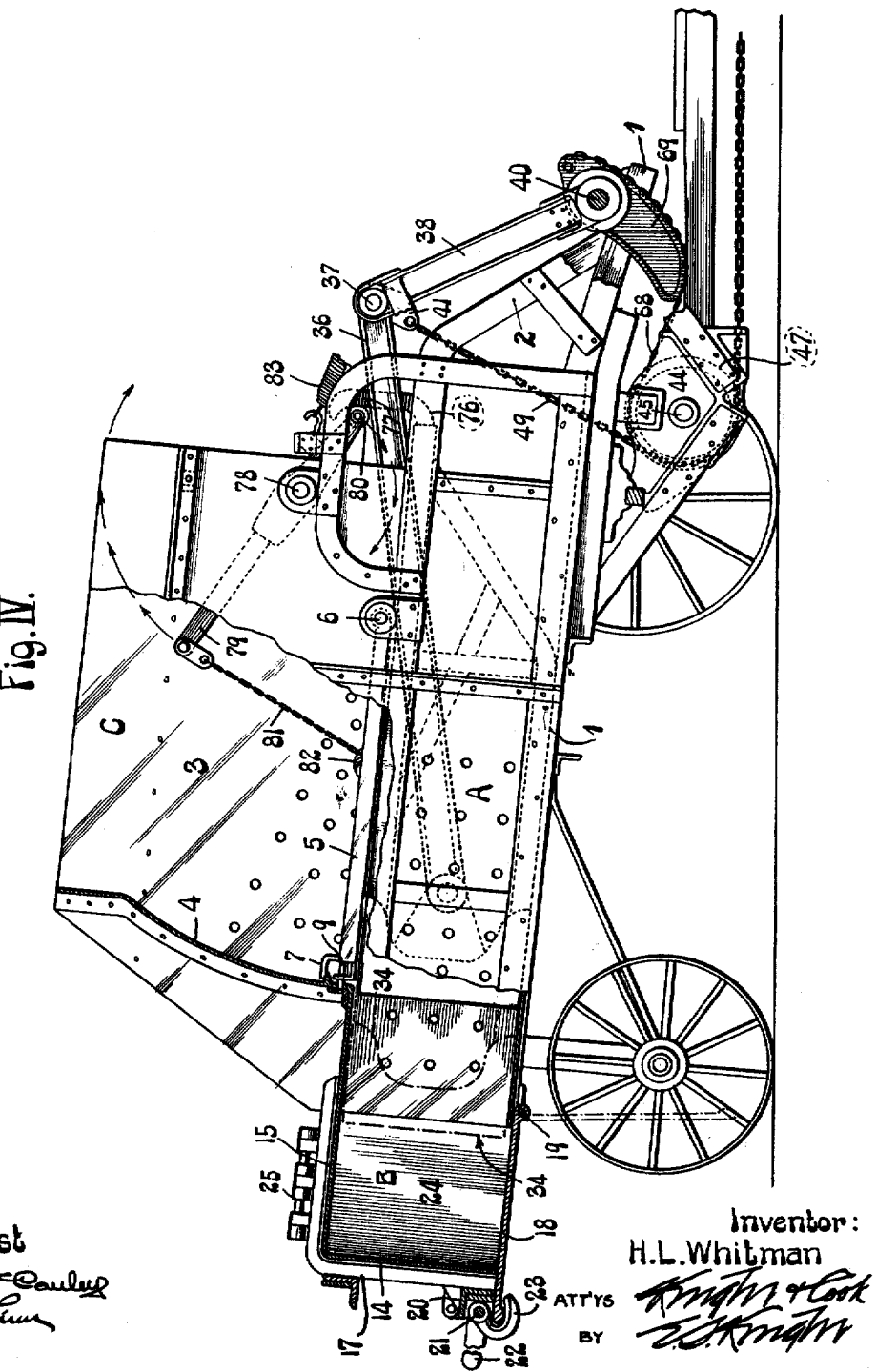

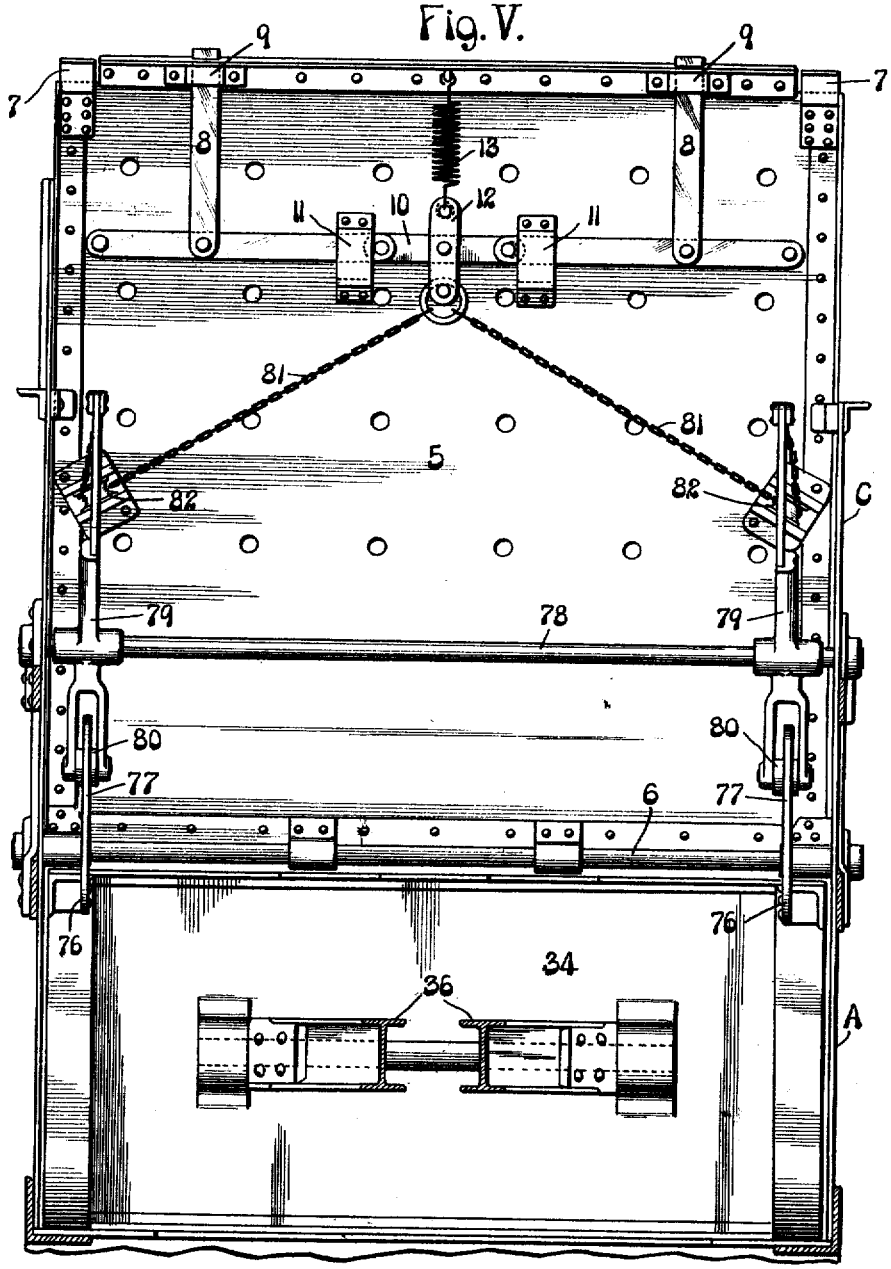

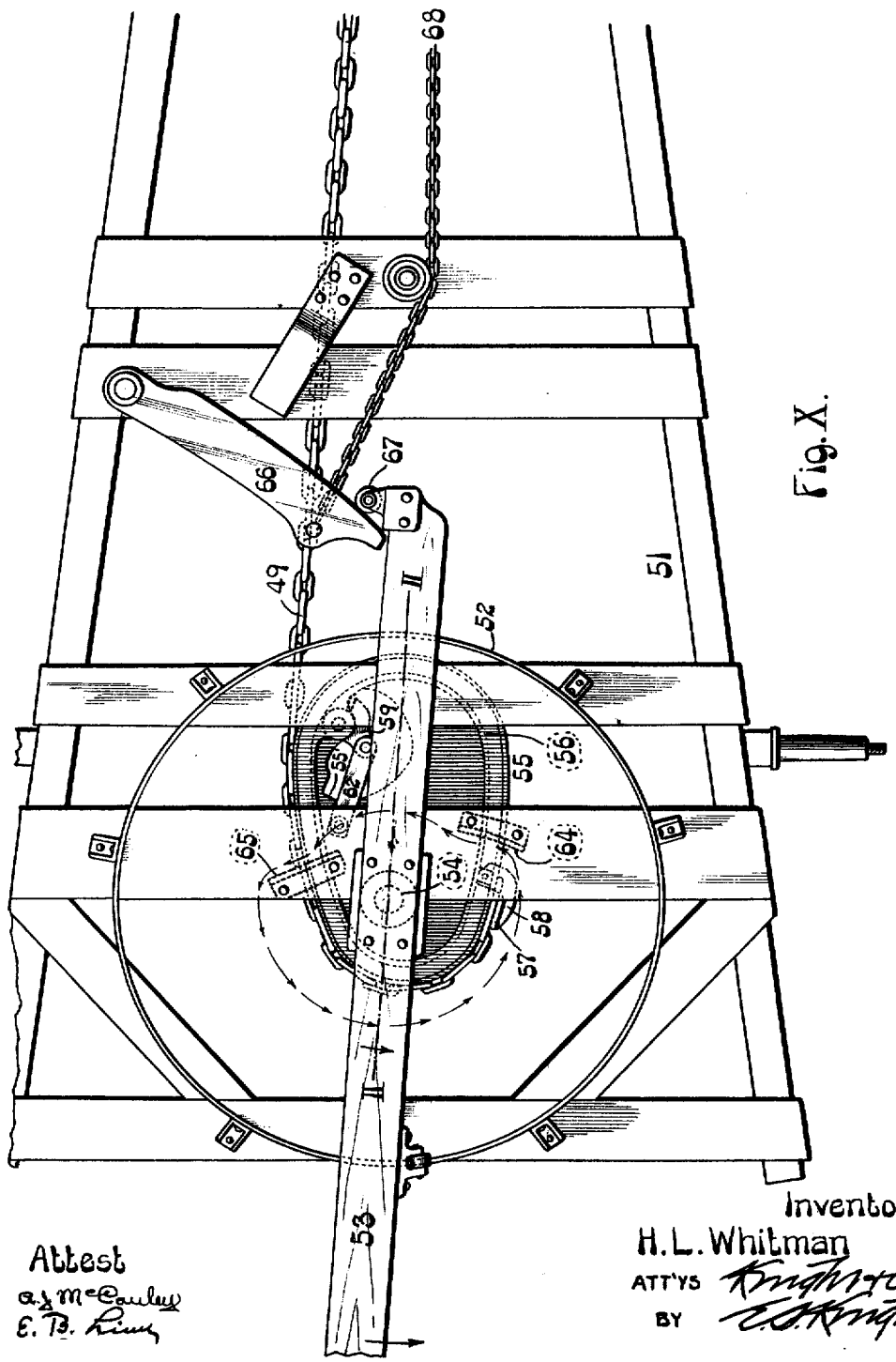

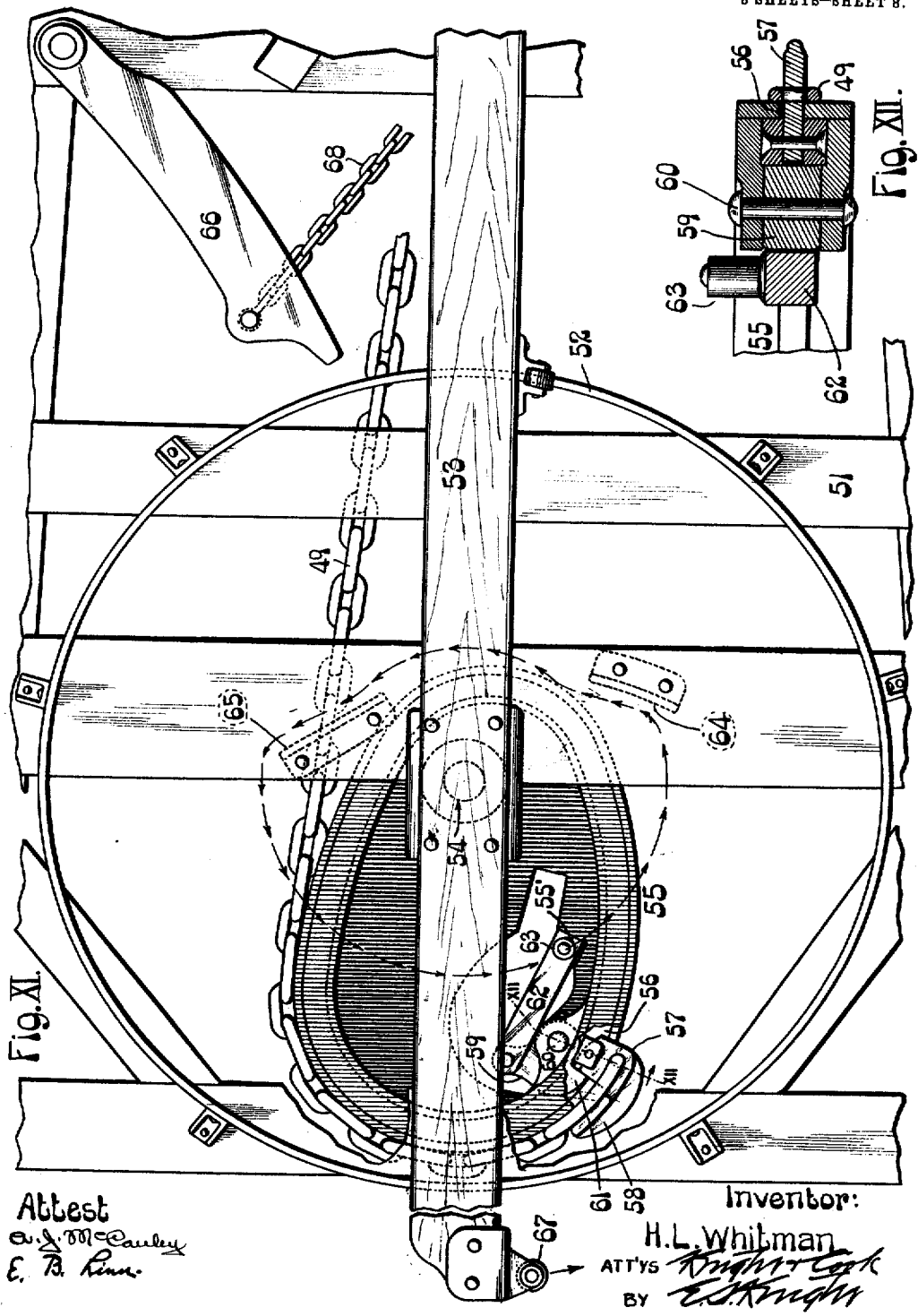

UNITED STATES PATENT OFFICE.

HENRY L. WHITMAN, OF ST. LOUIS, MISSOURI.

BALING-PRESS.

1,006,327.  Specification of Letters Patent.  Patented Oct. 17, 1911.

Application filed December 9, 1910. Serial No. 596,462.

*To all whom it may concern:*

Be it known that I, HENRY L. WHITMAN, a citizen of the United States of America, residing at the city of St. Louis, in the State of Missouri, have invented certain new and useful Improvements in Baling-Presses, of which the following is a full, clear, and exact description, reference being had to the accompanying drawings, forming a part of this specification.

My invention relates to baling presses of the type wherein toggle mechanism is employed for the operation of the plunger, and it has for its objects the production of a baling press of this description that is very strong, durable and efficient in operation, with positiveness of action of the various parts at the proper periods.

Figure I is a top or plan view of my baling press. Fig. II is an enlarged section through the power mechanism taken on lines II—II, Figs. I and X. Fig. III is an enlarged side elevation, with the plunger in retracted position and the drop door above the trunk in elevated position. Fig. IV is in part an enlarged side elevation and in part a vertical longitudinal section, with the plunger in advanced position and the drop door in lowered position. Fig. V is an enlarged elevation of the drop door in elevated position and a vertical cross section of the frame back of the trunk of the press. Fig. VI is an enlarged top or plan view of the toggle mechanism. Fig. VII is a view partly in elevation and partly in section of the pull back arm operating members of the toggle mechanism. Fig. VIII is an enlarged view of the baling chamber of my press, partly in front elevation and partly in vertical cross section. Fig. IX is a horizontal section on line IX—IX, Fig. VIII. Fig. X is an enlarged top or plan view of the power mechanism, with the power chain inactive and the pull back mechanism ready for action. Fig. XI is an enlarged top or plan view of the power mechanism in condition for actuation of the plunger on its forward stroke. Fig. XII is an enlarged cross section taken on line XII—XII, Fig. XI.

In the accompanying drawings: A designates the trunk of my press and B the baling chamber at the front end of the trunk. C is the feed hopper above the trunk. These parts are of such width as to provide for the bales produced in my press having their greatest length transversely of the press.

The trunk A comprises a floor, side walls and longitudinal sills 1, top beams 2 that extend beyond both the front and rear ends of the trunk to support the compression box and the operating devices immediately associated with the trunk.

The hopper C comprises side walls 3 and a cam wall 4 at the front end of the hopper, the remaining wall being furnished by a drop door 5 at the rear end of the hopper supported by a transverse rod 6, and which is adapted to be lowered to the feed opening in the top of the trunk A to close it previous to the baling action. This drop door is provided at its free end with stops 7 adapted to engage suitable abutments at the foot of the cam wall 4 of the hopper when the door is lowered to close the feed opening and locking bolts 8, Fig. V, for engagement with said wall operable in keepers 9. The locking bolts are pivoted to transversely arranged lever arms pivotally attached to the drop door at their outer ends and united at their inner ends by a connecting bar 10, the two lever arms being loosely confined within guides 11 that permit movement of them longitudinally of the door.

12 is a pull bar attached to the connecting bar 10 and 13 is a draw spring uniting said pull bar to the drop door and serving to yieldingly hold the locking bolts 8 in protrusion, in order that they will perform their function of locking the door to the cam wall of the hopper following the descent of the door. The drop door is intended to be lowered manually, and is of such weight as to force the material in front of it in the hopper into the trunk of the press. Means provided for unlocking and lifting the drop door will be hereinafter described.

The baling chamber B located at the front end of the trunk A has free communication with said trunk, and the material to be baled is delivered from the trunk to the chamber upon each forward stroke of the plunger of the press.

14 is the front wall of the baling chamber and 15 the top wall, said walls being provided with vertical slots 16 through which bale ties may be passed in a manner to be explained. The walls 14 and 15 are reinforced at the slots therein by angle strips 17, (see Figs. IV, VIII and IX), attached to said walls.

18 is a bottom door hinged at 19 to the trunk A. The free end of this bottom door is upheld at the front of the baling chamber by a latch device supported by a transverse bar 20. The latch device just mentioned comprises a rock shaft 21, provided with an operating handle 22 and having fixed to it a plurality of hooks 23 adapted to engage and be removed from engagement with the free end of the bottom door. The bottom door is provided with slots 18' parallel with the slots 16 in the front and top walls of the baling chamber.

24 designates depending side doors of the baling chamber suspended by hinges 25 and adapted to open outwardly from the sides or ends of the chamber. These doors are provided in order that the ends of the bales may be produced in the baling chamber may be freed of restraint when the bottom door 18 is opened to discharge the bales. Provision is made for the closing and locking of the side doors upon the operation of the latch device that holds the bottom door 18 closed.

26 are horizontal bars spaced away from the lower ends of the side doors and provided with brackets 27 having upstanding lips 28, see Figs. VIII and IX.

29 are dogs pivoted at 30 to the brackets 27 and having their free ends presented toward the side doors. In the free ends of the dogs are anti-friction rollers 31, and at the rear ends of the dogs are heels 32 adapted to strike the lips of the brackets 27 to limit the movement of the dogs when they perform their functions of closing the side doors.

33 are connecting rods pivoted to the dogs 29 and to crank arms 34 fixed to the rock shaft 21. When the rock shaft 21 is rotated to disengage the hooks 23 from the bottom door of the baling chamber and permit it to fall open, the dogs 29 are moved from the side door holding positions, seen most clearly in Fig. IX, through the medium of the connecting rods 33, thus releasing the side doors and permitting them to open under pressure of a bale in the baling chamber. Then, the baling chamber having been emptied, the bottom door is restored to closed position, and upon the latch device provided therefor being operated, the dogs are carried into engagement with the side doors to close them and hold them closed during the next baling operation.

The insertion of bale ties and their application to the bales is very simply accomplished by passing such ties through the slots in the top and front walls of the baling chamber and the bottom door 18, wrapping them around the bales and tying them in any usual manner.

34 designates the plunger of my press operable in the trunk A to deliver material into the baling chamber B after it has been fed into the trunk from the hopper C and the drop door 5 has been closed. The plunger is provided with vertical grooves 35 to receive the bale ties while the bales in the baling chamber are held under pressure by the plunger.

36 designates the pitman pivoted to the plunger 34 and preferably composed of two members spread apart at their connection with the plunger, see Fig. V, while their opposite ends are arranged in close proximity to each other, see Fig. VI.

37 is a pivot rod in the rear end of the pitman.

38 are toggle arms of a toggle of which the pitman 36 constitutes the remainder of such toggle, the arms 38 being connected to the pitman by the pivot rod 37. The toggle arms 38 are carried by sleeves 39 mounted on a transverse supporting rod 40 supported by the rear extensions of the trunk sills 1 and beams 2, thereby providing for swinging movement of the toggle arms in the forward and backward movements of the pitman and plunger. At the junction of the pitman and toggle arms 38 is an eye block 41 to which the power mechanism about to be described is attached.

42, (see Fig. VI), designates frame arms loosely supported by sleeves 43 on the rod 40 and adapted to partake of movement similar to that partaken of by the toggle arms 38. These frame arms support a pair of separated shaft supporting members 44 in which a shaft 45 is mounted. The members 44 are united by a cross piece 46.

47 and 48 are sheaves loosely mounted on the shaft 45.

49 designates the main power chain of my press. This chain is attached to the eye block 41 located at the junction of the pitman and toggle arms 38 and leads rearwardly to the power device, being operable in contact with the sheave 47 and also beneath a guide sheave 50 loosely supported by the transverse rod 40.

Referring now to the power mechanism of my press, which is illustrated in Figs. I, II and X to XII, inclusive, 51 designates the framework by which this mechanism is supported. On the framework is a circular track 52. 53 is the sweep ridable on the circular track and having fixed to it a vertical rotatable shaft 54. 55 designates a cam fixed to the vertical shaft 54 at the periphery of which is a T-groove 56. The main power chain 49 leads from the pitman to the cam 55 and is placed in operative connection with the cam by a traveler 57 attached to the end of the chain and operable in the T-groove in the cam 55. The traveler 57 has a head 58 which rests against the outer face of the end link of the power chain to prevent pivotal movement of the traveler when its nose within the groove of the cam is placed in engagement with a cam carried device next to be mentioned. 59 designates a latch dog pivoted to the cam 55 at 60 and having a nose 61 adapted to enter the groove in said cam to be engaged by the nose of the traveler 57. 62 is a detent arm pivoted to the latch dog 59 and adapted to partake of swinging movement independently of said dog, the said detent arm being equipped with a roller 63 for engagement with a shifting device to be more particularly referred to. The free end of the detent arm 62 is movable into and out of engagement with a shoulder 55' on the cam 55 and which is of service in so holding the detent arm as to maintain the nose of the latch dog 59 in the groove of the cam 55. 64 and 65 designate respectively throw-out and throw-in cams supported by the framework 51 adjacent the path of circular travel of the detent arm 62 and which are adapted to be engaged by the roller 63 carried by said arm. The cam 64 acts to move the detent arm laterally out of engagement with the shoulder 55' and the cam 65 acts to move the arm laterally to cause it to engage said shoulder. At the time the power chain 49 is to be operated, or is in operation, the traveler 57 is engaged with the latch dog 59, as seen in Fig. XI, and said dog is held from backward movement by the detent arm 62 resting against the shoulder 55'. Therefore, when the sweep of the press, the shaft 54 and the cam 55' are rotated, the power chain is wrapped around the cam 55 and so drawn upon as to operate the toggle comprising the toggle arms 38 and pitman 36, whereby the plunger is moved in its forward stroke. As the plunger reaches the end of its forward stroke, the roller 63 carried by the detent arm 62, in following the course indicated by arrows, Fig. XI, engages the throw out cam 64 whereby the detent arm is moved away from the shoulder 55', freeing the latch dog so that it will swing away from the traveler 57 and allow said traveler to play idly in the cam 55 following its service with respect to the forward stroke of the press plunger. It is as well to here state that the traveler then remains inactive for any function for the period of time consumed in the return stroke of the plunger which takes place while the roller 63 is passing from the throw-out cam 64 to the throw-in cam 65, and the cam 55 is partaking of still greater movement than that necessary to carry the roller 63 to the throw-in cam. When the roller 63 reaches the throw-in cam, the detent arm 62 is moved into engagement with the shoulder 55', and the latch dog is locked in position ready to receive the traveler 57 at the proper time for the next performance of office by the power chain 49.

I will now proceed to the description of the pull-back mechanism.

66 designates a pull-back lever pivotally mounted on the framework of the power device and having the extremity of its free end so disposed as to be engaged by the sweep 53 in its circuit, the sweep being preferably provided with an antifriction roller 67 for such engagement.

68 is a pull-back chain attached to the free end of the pull-back lever and leading therefrom to the trunk of the press. The pull-back chain extends beneath the sheave 48, then upwardly thereonto and rearwardly therefrom, the said pull-back chain being attached at its forward end to a cam lever 69 by which the toggle arms 38 are operated and the pitman and plunger are retracted.

I wish to draw particular attention to the fact that the pivot of the pull-back lever 66 is offset laterally from the axis of the sweep 53. The free end of said lever is therefore so positioned in the path of movement of the sweep as to provide for the sweep striking the pull-back lever near its free end to thereafter ride rearwardly on the lever toward its pivot. As a consequence, the greatest leverage is obtained from the pull-back lever immediately after the sweep engages it and the strongest pull upon the chain is exerted at the beginning of the backward stroke of the plunger when most needed.

The cam lever 69 is carried by a sleeve 70 loosely mounted on the transverse supporting rod 40, said sleeve having a round journal 71 for the sheave 50 that receives the power chain 49, and a non-circular neck 72, (see Fig. VII).

73 is a connecting bar uniting one of the toggle arms 38 to the cam lever 69. The other toggle arm is placed in connection with the cam lever by a connecting bar 74 attached to a collar 75 mounted on the non-circular neck of the sleeve 70. It will be discerned that when the pull-back chain 68 is drawn rearwardly by the pull-back lever of the power device, movement is imparted to the cam lever 69 that causes the connections between the sleeve 70 and the toggle arms 38 to impart the desired retraction of the plunger of the press.

The drop door 5 that closes the feed opening of the trunk of the press is operated to lift it through the medium of means carried in part with the plunger so arranged that said door will be elevated just previous to the completion of each forward stroke of the plunger. In this regard it should first be noted that the plunger has attached to it rearwardly extending pull-bars 76, suitably braced, provided with upturned fingers 77.

78 designates a cross shaft mounted in suitable bearings in the side walls of the hopper C.

79 are double arm drop door operating levers fixed to said shaft and having in their lower arms anti-friction rollers 80 adapted to be engaged by the pull bar fingers 77 to move the upper arms of the levers rearwardly as the plunger moves forwardly. Chains 81 are attached to the upper arms of the levers 79 and lead therefrom through pulley blocks 82 carried by the drop door, and thence to the pull bar 12, so that the latch bolts 8 will be retracted previous to the lifting of the drop door by the described mechanism.

83 designates buffer springs that serve to relieve the toggle of the press of shock when the plunger is retracted. These springs are attached to the trunk of the press and are connected to the toggle by chains 84.

I claim:

1. In a baling press, a baling chamber having a bottom door, means for holding said bottom door in a closed position, side doors, and side door operating devices pivoted to the sides of the baling chamber structure.

2. In a baling press, a baling chamber having a bottom door, means for holding said bottom door in a closed position, side doors, and side door operating devices pivoted to the baling chamber structure at points directly opposite the side doors.

3. In a baling press, a baling chamber having a movable bottom door and movable side doors, and side door operating devices movable independently of the bottom door.

4. In a baling press, a baling chamber having a movable bottom door and movable side doors, and side door operating devices movable independently of the bottom door; said operating devices being pivoted to the baling chamber structure at points directly opposite the side doors.

5. In a baling press, a baling chamber comprising movable side doors and a bottom door, a rotatable shaft provided with hooks for engagement with said bottom door, dogs for engagement with said side doors, and connection devices between said shaft and said dogs whereby the dogs are operated to move the side doors inwardly.

6. In a baling press, a baling chamber having a bottom door, and means for holding said bottom door in a closed position, said means including a rotatable shaft provided with hooks for engagement with said bottom door.

7. In a baling press, a trunk having a feed opening, a drop door for closing said feed opening, a plunger, a pair of levers having connection with said drop door, and pull bars rigidly connected to said plunger and having upturned fingers for engagement with said levers to impart movement thereto and cause them to elevate said drop door.

8. In a baling press, a plunger, a toggle device for operating said plunger, comprising toggle arms and a rod on which said toggle arms are loosely mounted, a sleeve loosely mounted on said rod at a point between the toggle arms, means for rotating said sleeve, and rigid connecting bars uniting said toggle arms to said sleeve.

9. In a baling press, a trunk, a plunger operable in said trunk, a feed hopper above said trunk, a drop door serving as one of the walls of said feed hopper movable to close the feed opening of said trunk, locking bolts carried by said drop door, lever arms pivoted at their outer ends to said drop door and having connection with said locking bolts, a connecting member pivoted to the inner ends of said lever arms, a spring controlled pull bar pivoted to said connecting member, and means operable by said plunger for actuating said pull bar to release the locking bolts and elevate said drop door.

10. A baling press power mechanism, comprising a rotatable power cam, a traveler operable in said cam, a latch dog pivotally connected to said cam adapted to be engaged by said traveler, and a detent pivoted to the latch dog for holding said dog in operative position.

11. A baling press power mechanism, comprising a rotatable power cam, a traveler operable in said cam, a latch dog pivotally connected to said cam adapted to be engaged by said traveler, a detent for holding said dog in operative position, and means whereby said detent is automatically moved from an operative to an inoperative position.

12. A baling press power mechanism, comprising a rotatable power cam, a traveler operable in said cam, a latch dog pivotally connected to said cam adapted to be engaged by said traveler, a detent for holding said dog in operative position, and means whereby said detent is automatically moved from an inoperative to an operative position.

13. A baling press power mechanism, comprising a rotatable power cam, a traveler operable in said cam, a latch dog pivotally connected to said cam adapted to be engaged by said traveler, a detent for holding said dog in operative position, and a throw out cam in the path of travel of said detent whereby it is automatically moved from an operative to an inoperative position.

14. A baling press power mechanism, comprising a rotatable power cam, a traveler operable in said cam, a pivotally mounted latch dog carried by said cam adapted to be engaged by said traveler, a detent for holding said dog in its operative position, and a throw in cam in the path of said detent whereby it is automatically moved from an operative to an inoperative position.

15. In a baling press power mechanism, the combination of a rotatable cam, a traveler slidably mounted in the periphery of said cam, a power transmitting device connected to said traveler, a latch dog pivoted to said cam and adapted to move into and out of the path of the traveler, a shiftable detent arm pivoted to the latch dog, abutments on the cam adapted to be engaged by the detent arm, and means for shifting said detent arm.

16. In a baling press, a trunk, a plunger operable in said trunk, a feed hopper above said trunk, a drop door serving as one of the walls of said feed hopper movable to close the feed opening of said trunk, locking bolts carried by said drop door, lever arms pivoted to said drop door and having connection with said locking bolts, a spring controlled pull bar pivotally connected to said levers, a pair of flexible pull members attached to said pull bar, a rockable shaft to which said pull members are independently connected, lever arms carried by said rockable shaft, and fingers carried by said plunger for operating said lever arms to rotate said shaft and cause the flexible pull members to release said latch bolts and elevate the drop door.

17. In a baling press, a plunger, power mechanism including a sweep for imparting forward movement to said plunger, a pivoted pull back lever operable by said sweep, the pivot of said pull back lever being offset laterally from the axis of said sweep and having the extremity of its free end arranged in the path of movement of said sweep so that the latter bears against the extremity of the pull back lever and down the back of the latter, and means for connecting the free end of said pull back lever with said plunger, said connecting means being attached to the pull back lever at a point between the ends of said lever.

HENRY L. WHITMAN.

In the presence of—
E. B. LINN,
A. J. MCCAULEY.

---

Copies of this patent may be obtained for five cents each, by addressing the "Commissioner of Patents, Washington, D. C."